(12) United States Patent
Yu et al.

(10) Patent No.: US 8,977,001 B2
(45) Date of Patent: Mar. 10, 2015

(54) DEVICE AND METHOD FOR MONITORING VIDEO OBJECTS

(75) Inventors: Jie Yu, Hildesheim (DE); Dirk Farin, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 169 days.

(21) Appl. No.: 13/518,580

(22) PCT Filed: Dec. 14, 2010

(86) PCT No.: PCT/EP2010/069566
§ 371 (c)(1),
(2), (4) Date: Sep. 10, 2012

(87) PCT Pub. No.: WO2011/076609
PCT Pub. Date: Jun. 30, 2011

(65) Prior Publication Data
US 2012/0328153 A1    Dec. 27, 2012

(30) Foreign Application Priority Data
Dec. 22, 2009    (DE) .......................... 10 2009 055 127

(51) Int. Cl.
*G06K 9/00*    (2006.01)
*H04N 5/225*    (2006.01)

(52) U.S. Cl.
CPC ................................. *G06K 9/00771* (2013.01)
USPC ......................................... 382/103; 348/169

(58) Field of Classification Search
CPC ................................. G06T 1/00; H04N 7/00
USPC ............. 382/103, 107, 236; 348/43, 69, 169, 348/171, 208.16, 239, 460, 471, 474, 522; 386/235, 278, 300, 314, 353; 725/73, 725/74, 86, 105, 113, 135
See application file for complete search history.

(56) References Cited

U.S. PATENT DOCUMENTS

| | | | |
|---|---|---|---|
| 8,311,272 B2 * | 11/2012 | Matsugu et al. | 382/103 |
| 2008/0231709 A1 * | 9/2008 | Brown et al. | 348/169 |
| 2009/0245573 A1 * | 10/2009 | Saptharishi et al. | 382/103 |
| 2009/0315978 A1 * | 12/2009 | Wurmlin et al. | 348/43 |
| 2010/0194883 A1 | 8/2010 | Busch | |

OTHER PUBLICATIONS

PCT/EP2010/069566 International Search Report dated Jul. 28, 2011 (Translation and Original, 4 pages).

* cited by examiner

*Primary Examiner* — Abolfazl Tabatabai
(74) *Attorney, Agent, or Firm* — Michael Best & Friedrich LLP

(57) ABSTRACT

The invention relates to a device, method, computer program, and a computer program product for monitoring objects, in particular for monitoring scenes of objects captured on video. An object is thereby repeatedly detected and tracked, wherein a tracking device is fed back to a device for object model selection, so that when detected repeatedly, considering tracking parameters determined when tracking the object, the tracking parameters are fed to the selection device and can be considered for detecting.

17 Claims, 1 Drawing Sheet

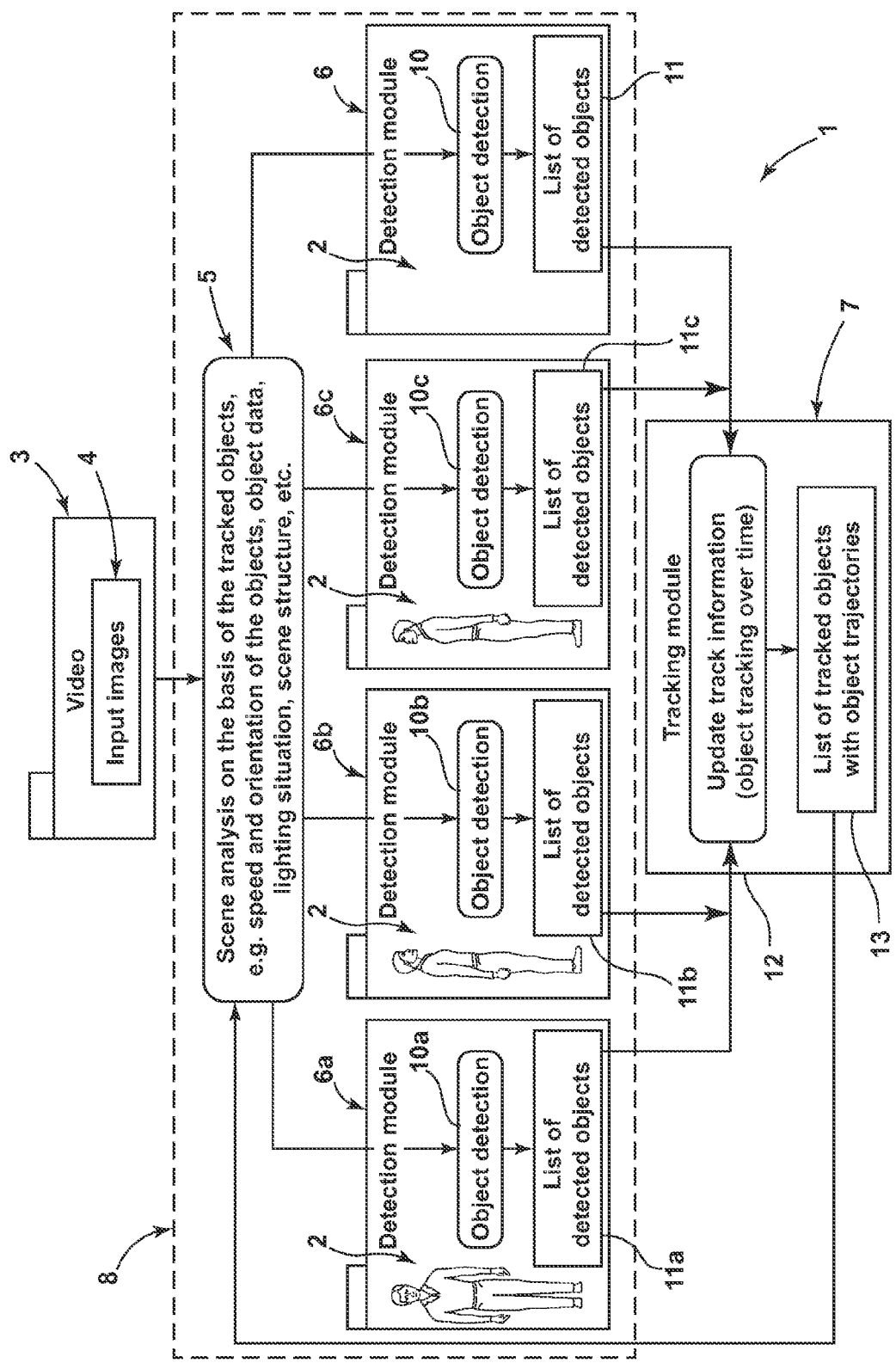

DEVICE AND METHOD FOR MONITORING VIDEO OBJECTS

BACKGROUND OF THE INVENTION

The invention relates to a method for monitoring objects, in particular for monitoring scenes of video-captured objects.

Furthermore, the invention relates to a computer program and to a computer program product for carrying out the method of monitoring scenes of video-captured objects.

Moreover, the invention relates to an apparatus for monitoring objects, in particular for monitoring scenes of video-captured objects.

The invention is based on a surveillance system, in particular on a surveillance system for observing one surveillance region or a plurality of surveillance regions, wherein surveillance cameras are directed at the surveillance region or the surveillance regions. The video images recorded by the surveillance cameras are often forwarded to a central unit, for example to a surveillance control center, and evaluated there by surveillance personnel or in an automated manner. In other applications, the automatic evaluation is carried out directly in the camera. Since video surveillance systems of this type often have a multiplicity of surveillance cameras, e.g. 100 to 1000 thereof, the multiplicity of video images cannot practically be monitored by a limited number of monitoring personnel, such that automated image evaluation is increasingly gaining in importance.

In particular, the invention is based on a method, a computer program, a computer program product and an apparatus for monitoring objects, in particular for monitoring scenes of video-captured objects.

The present invention relates to surveillance systems, in particular video surveillance systems, with a method for video object tracking by a detector tracking system.

Video surveillance systems are known from the prior art. In the case of such video surveillance systems, a specific object such as a person or an automobile, for example, is tracked by a video sequence. The recognition and tracking of the object in a video sequence is generally realized by a two-part system. One part of the latter consists of a detector or a detector device, which localizes the object on the basis of an object model in an image or a restricted image region. Furthermore, the system consists of a module for object tracking (tracking module, tracking device), which tracks the position of the object over time. In this context, the tracking module determines tracking parameters associated with the object being monitored, such as, for example, a direction of movement or a movement speed. Object detectors of this type are used, inter alia, in video surveillance systems and similar applications such as systems for face detection in digital cameras for automatic focusing or in systems for person detection in a vehicle for collision avoidance, in order to recognize the objects of a given object class such as, for example, a person, a face or an automobile in the image. In this case, the object model is embodied as an automatically learned classifier which is trained to recognize images of this predetermined object class.

DE 10 2007 058 959 A1 discloses surveillance systems, for example video surveillance systems. These surveillance systems serve for monitoring one or a plurality of surveillance regions, surveillance cameras being directed at the surveillance region or regions. The video images recorded by the surveillance cameras are forwarded for example to a central unit, for example to a surveillance control center, and are evaluated there by surveillance personnel or in an automated manner. In this case, use is made of configuration modules for the surveillance system, wherein the surveillance system is designed to classify objects with object properties in a surveillance scene on the basis of object property ranges as surveillance objects. Comprehensive object surveillance with a plurality of objects to be monitored which move, for example, in different directions at different speeds necessitates a corresponding computing power.

SUMMARY OF THE INVENTION

Methods, computer programs, computer program products, and devices according to certain embodiments of the invention include features that realize improved object surveillance and require less computing power that prior art methods and devices.

Feeding back tracking parameters for detecting objects means that detecting on the basis of the tracking parameters fed back is performed more effectively and more rapidly. A tracking device is connected with feedback to a device for object model selection, such that, upon detecting being repeated with account being taken of tracking parameters determined in the course of tracking the object, the tracking parameters are fed to the selection device and can be taken into account for detecting. Instead of detecting an object on the basis of a single model covering all variations of the object, on the basis of the tracking parameters fed back one or more object models are selected for detection which in each case describe a smaller model or variation range of the object and thus represent a more specific representation of the object. Consequently, an object can be detected more accurately and more rapidly on the basis of an object model having a narrower variation range and can be tracked and thus monitored more simply. The detector device can be subdivided into a plurality of detector devices or detection modules which have more specific models for an object detection, which can then be used in a next monitoring step, for example a next image of a scene. A selection module determines, on the basis of the captured tracking parameters and general scene parameters, which detection module is used for the detection of a specific object. The entire system is optionally embodied as a learning or self-learning system in which the parameter ranges for selection are optimized and adapted anew with each repetition step of the method.

By virtue of the above-described selection of a model having a narrower model range, that is to say an assignment to a subgroup or a subclass, by feedback of tracking parameters determined in the tracking module, the detector device can use a more specific object model, which leads to more robust recognition results and to fewer incorrect detections (for example as a result of a fuzzy model).

The feedback of information from the long-term observation of the object helps to determine the appropriate object model. Simple testing of all object models would not effectively increase the recognition results, since, owing to the higher total variance of the models, the number of incorrect detections would rise as well. Consequently, one advantage of the invention resides in the increase in the recognition capacity of the detector device. Furthermore, by virtue of the more specific object models, that is to say the models having a narrower variation range, in contrast to the more complex, more general models, that is to say the models having a wider variation range, the computing time can be reduced. Possible tracking parameters on the basis of which a subclass or a submodel is determined for the objects are, for example, the speed of the object, in which case a detector for moving objects can, for example, rapidly discard static image contents, or the orientation of the object, in order, for example, to detect different views of the object in a targeted manner. Possible scene parameters comprise the object density, which, for example, influences the number of expected objects per unit area, the expected object masking, the lighting situation, such as, for example, effects such as fog, light sources and the like, and the scene structure, such as, for example, knowledge of articles masking the objects.

One particularly preferred embodiment provides for detecting and/or tracking to be carried out in a model-based manner, that is to say to comprise selecting at least one of the models. For detecting and analogously also for tracking, from the predefined models at least one is selected. Preferably, the number of models is reduced further and further in the course of surveillance. In a first step, from the n models at least one model is not taken into account in a next step, such that then a maximum of only n−1 models are to be taken into account. This can be continued until only one model is to be taken into account. The models can be adapted with regard to their tracking parameter range and/or scene parameter range. Selecting is performed with the tracking parameters and/or scene parameters being taken into account. Precisely at the start of surveillances there are few data available about the objects to be monitored. The group boundaries for detecting the objects are defined in a correspondingly fuzzy manner. The more specific a model and the sharper the boundaries, the higher the detection capability. The objects to be detected are compared with the parameter ranges of the respective object models for detecting purposes. If the tracking parameters and scene parameters of an object fall within a parameter range of an object model, then this object model is used for detecting the object. In the next step, the recognized object can be tracked. Tracking parameters are determined again during tracking. Said tracking parameters are used during a renewed detection in order to further facilitate the detection. This is performed, in particular, by a new selection of an appropriate model having a smaller variation range and by changing the parameter ranges for the selection of the object models.

Preferably, detecting and/or selecting are/is carried out on the basis of predefined models. In this case, predefining the model comprises predefining models having different tracking parameter ranges and/or scene parameter ranges. Detecting and/or tracking comprise(s) selecting at least one of the models. In this case, selecting a model is carried out on the basis of tracking parameters and/or scene parameters. In the course of surveillance, an object to be monitored is detected and tracked more and more reliably, since a model appropriate to the object to be monitored is selected.

A further advantageous embodiment provides for selecting to comprise, at least at the beginning of a surveillance, adapting the parameter ranges, which in this way makes the models used for the detection more precise with regard to the object to be monitored. Accordingly, selecting and/or detecting comprise(s) altering the tracking parameter ranges and/or scene parameter ranges.

If an object cannot be assigned to exactly one model or submodel, then detecting is carried out on the basis of a plurality of models having different parameter ranges. By way of example, an object which moves diagonally upward toward the right is not reliably captured solely by the models for objects moving toward the right and objects moving upward. Rather, the object will fall within both parameter ranges, such that both models shall be used for reliable detection.

A further advantageous embodiment provides for the predefined object models to comprise both models having a large variation range and subordinate models having a smaller variation range. By way of example, a model having a large variation range can comprise the detection of persons in all views, whereas a subordinate model is specialized for the detection of persons with a specific direction of movement. This can be refined further and further, such that, by way of example, separate models with different leg positions or arm positions are predefined. At the beginning of the surveillance of an object, as yet little information about the object is present, and so the selection module for the detection will select an object model having a large variation range. If more precise tracking parameters are known in a later step, then by selecting a more specific object model having a smaller variation range the detection accuracy is increased, and an increase in detection speed is made possible.

The method is preferably implemented as a computer program and can be distributed in any desired manner as a computer program product and used at different locations. Moreover, the method can easily be retrofitted.

The apparatus according to the invention for monitoring objects, in particular for monitoring scenes of video-captured objects, comprising at least one detector device for detecting the object and at least one tracking device for tracking the object, is characterized in that the tracking device has means for capturing tracking parameters and is connected with feedback to the detector device, such that, upon detecting being repeated, the tracking parameters are fed to the detector device and can be taken into account for detecting. The apparatus in particular also comprises sensors for imaging real objects as video objects, for example cameras. The apparatus comprises overall means which are necessary for carrying out the method according to the invention.

BRIEF DESCRIPTION OF THE DRAWING

An exemplary embodiment of the invention is illustrated in the drawing and explained in greater detail in the description below. The FIGURE shows:

schematically as a block diagram an apparatus for monitoring objects.

DETAILED DESCRIPTION

The FIGURE shows schematically as a block diagram an apparatus 1 for monitoring objects, which apparatus implements a method according to the invention for monitoring objects. The apparatus 1 comprises an imaging unit, which is embodied as video system 3 and generates an image of the real surveillance region. The video system 3 generates different images 2 in short temporal succession, which images when joined together produce a scene. The images 2, present as input images 4, are analyzed in a detector device 8. The detector device 8 comprises detection modules 6 and a model selection module 5, which selects or chooses the detection modules 6, 6a, 6b, 6c. In this case, objects present in the scene are detected and various object parameters are captured. By way of example, an object is classified, that is to say that the object parameters are compared with the parameter ranges of the predefined object models and assigned to an appropriate model or a group of models. In this case, the objects are detected in the detection modules 6, 6a, 6b, 6c in the sections 10, 10a, 10b, 10c. The latter detect an object on the basis of a predefined model description and generate a list of the detected objects 11 after the objects have been detected. This list of objects 11 is forwarded to a tracking device 7. The tracking device 7 carries out an object tracking 12 over time. In this case, tracking parameters or track information are/is captured and updated 13. The list of objects 11, which was forwarded to the tracking device 7 by the detector device 8, is supplemented by the tracking parameters. In this case, by way of example, a movement or object trajectory is assigned to each object of the object list 11. Unlike in the case of solutions in accordance with the prior art, the data resulting from the tracking device 7 are fed back to the model selection 5, such that one or more detection modules 6, 6a, 6b, 6c are selected for the detection. In the embodiment illustrated in the FIGURE, a plurality of detection modules 6, 6a, 6b, 6c are provided, which are selected on the basis of the feedback of the information obtained by the tracking device 7 and in each case have narrower parameter ranges than, for example, a single detection module 6 for all objects. The detection module 6a has, for example, a model for persons moving straight on. The detection module 6b has a model for persons moving toward the right, and the detection module 6c has a model for persons moving toward the left. If an object corresponding to the model (person moving straight on, toward the right or toward the left, respectively) is detected in the corresponding section 10a, 10b, 10c, a respective list 11a, 11b, 11c with the objects which satisfy the criteria of the model or of the group is created in the corresponding section.

The parameter ranges used by the detection module 6 which was selected by means of the corresponding selection module 5 can be adapted to the respective situation on the basis of the tracking parameters and/or the scene parameters and thus, as the surveillance time progression increases, produce a more and more selective choice of the model to be used for detection. The performance of the apparatus 1 increases as a result of this filtering-out of a reduced object model.

For by virtue of the fact that, in contrast to known solutions, instead of a detector device having only one object model 6 having fuzzy boundaries or wide model ranges, a plurality of detection modules 6a, 6b, 6c each having a smaller variation range are used which are in each case specialized for an object subclass of the original detector device, the surveillance effectiveness increases. In this case, the choice of the subclass is made by the model selection module 5, which is controlled by tracking parameters of the tracking device 7, also designated as tracking module.

In the exemplary embodiment illustrated, the apparatus 1 is embodied as a system for tracking persons in a video sequence. In contrast to a system according to the prior art, which would have only one detector device 8 that reacts to all possible types of persons, the system according to the invention has a detector device 8 having a main detection module 6 and a plurality of subdetection modules 6a to 6c functioning as subdetectors. The main detection module 6 has a model having a wide variation range. The latter is used in particular at the beginning of a surveillance since, at the beginning of a surveillance, a large quantity of undefined objects are present in a scene. In order to monitor specific objects, the detection modules 6a to 6c are provided, which comprise models having smaller variation ranges that are adapted to specific objects. Consequently, the model of the main detection module 6 can be subdivided into submodels of the subdetection modules 6a to 6c. Consequently, a detection module 6 having a wide model range is subdivided into specific detection or detector modules 6a to 6c, for example for persons moving straight on 6a, moving toward the right 6b, and moving toward the left 6c. From the history of the object movement, which is determined in the tracking device 7, a model selection module 5 selects the appropriate module 6a-6c or a group of modules which will best describe the object in the next image. Afterward, only this specific detection module 6, 6a, 6b, 6c is used for recognizing the object in the next image. Detecting can also be carried out by means of a plurality of detection modules 6, 6a, 6b, 6c, for example if a plurality of detection modules are applicable to the object to be monitored, for example in the case of a diagonal movement.

The invention claimed is:

1. A method for monitoring objects, the method comprising steps of:
   selecting an object model from a plurality of object models based on tracking parameters;
   detecting an object based on the selected object model; and
   tracking the object and the object's position within a video sequence over time,
   wherein the steps are repeated for a plurality of images in the video sequence and tracking the object includes determining the tracking parameters.

2. The method as claimed in claim 1, wherein the plurality of object models includes predefined object models having different tracking parameter ranges.

3. The method as claimed in claim 2, wherein detecting the object includes altering the tracking parameter ranges of the predefined object models.

4. The method as claimed in claim 1, wherein selecting the object model from the plurality of object models is further based on scene parameters.

5. The method as claimed in claim 4, wherein the plurality of object models includes predefined object models having different scene parameter ranges.

6. The method as claimed in claim 5, wherein detecting the object includes altering the scene parameter ranges of the predefined object models.

7. A non-transitory computer-readable storage medium storing a computer program that when executed on a computer cause the computer to perform steps of:
   selecting an object model from a plurality of object models based on tracking parameters;
   detecting an object based on the selected object model; and
   tracking the object and the object's position within a video sequence over time,
   wherein the steps are repeated for a plurality of images in the video sequence and tracking the object includes determining the tracking parameters.

8. The non-transitory computer-readable storage medium as claimed in claim 7, wherein the plurality of object models includes predefined object models having different tracking parameter ranges.

9. The non-transitory computer-readable storage medium as claimed in claim 8, wherein detecting the object includes altering the tracking parameter ranges of the predefined object models.

10. The non-transitory computer-readable storage medium as claimed in claim 7, wherein selecting the object model from the plurality of object models is further based on scene parameters.

11. The non-transitory computer-readable storage medium as claimed in claim 7, wherein the plurality of object models includes predefined object models having different scene parameter ranges.

12. The non-transitory computer-readable storage medium as claimed in claim 11, wherein detecting the object includes altering the scene parameter ranges of the predefined object models.

13. An apparatus for monitoring objects, the apparatus comprising:
   a detector device configured to
     select an object model from a plurality of object models based on tracking parameters, and detect an object based on the selected object model; and a tracking device configured to track the object and the object's position within a video sequence over time, and determine the tracking parameters.

14. The apparatus as claimed in claim 13, wherein detecting the object includes altering the tracking parameter ranges of the predefined object models.

15. The apparatus as claimed in claim 13, wherein selecting the object model from the plurality of object models is further based on scene parameters.

16. The apparatus as claimed in claim 15, wherein the plurality of object models includes predefined object models having different scene parameter ranges.

17. The apparatus as claimed in claim 16, wherein detecting the object includes altering the scene parameter ranges of the predefined object models.

* * * * *